US010013844B2

(12) United States Patent
Jackson et al.

(10) Patent No.: US 10,013,844 B2
(45) Date of Patent: *Jul. 3, 2018

(54) GAMING SYSTEM AND A METHOD OF GAMING

(71) Applicant: ARISTOCRAT TECHNOLOGIES AUSTRALIA PTY, LTD., North Ryde (AU)

(72) Inventors: Robert Jackson, Earlwood (AU); Marlene Knight, Bronte (AU)

(73) Assignee: ARISTOCRAT TECHNOLOGIES AUSTRALIA PTY LIMITED (AU)

( * ) Notice: Subject to any disclaimer, the term of this patent is extended or adjusted under 35 U.S.C. 154(b) by 0 days.

This patent is subject to a terminal disclaimer.

(21) Appl. No.: 15/601,307

(22) Filed: May 22, 2017

(65) Prior Publication Data

US 2017/0256120 A1 Sep. 7, 2017

Related U.S. Application Data

(63) Continuation of application No. 13/080,132, filed on Apr. 5, 2011, now Pat. No. 9,659,428, which is a continuation of application No. 11/936,640, filed on Nov. 7, 2007, now abandoned.

(30) Foreign Application Priority Data

Nov. 8, 2006 (AU) ................................ 2006906229

(51) Int. Cl.
*A63F 13/00* (2014.01)
*G07F 17/32* (2006.01)

(52) U.S. Cl.
CPC .................................... *G07F 17/32* (2013.01)

(58) Field of Classification Search
CPC ....................................................... G07F 17/32
See application file for complete search history.

(56) References Cited

U.S. PATENT DOCUMENTS

| | | | |
|---|---|---|---|
| 2,984,487 | A | 5/1961 | Schiffman |
| 5,769,716 | A | 6/1998 | Saffari et al. |
| 5,791,652 | A | 8/1998 | Nielsen |
| 5,882,258 | A | 3/1999 | Kelly et al. |
| 6,093,102 | A | 7/2000 | Bennett |
| 6,322,445 | B1 | 11/2001 | Miller |
| 6,368,214 | B1 | 4/2002 | Luciano |
| 6,666,766 | B2 | 12/2003 | Baerlocher et al. |
| 6,910,962 | B2 | 6/2005 | Marks et al. |
| 7,008,324 | B1 | 3/2006 | Johnson et al. |

(Continued)

OTHER PUBLICATIONS

Examiner's first report corresponding to Australian Patent Application No. 2007229326, dated Dec. 12, 2008.

(Continued)

*Primary Examiner* — Jason Skaarup
(74) *Attorney, Agent, or Firm* — McAndrews, Held & Malloy, Ltd.

(57) ABSTRACT

A gaming system comprising a display, an object selector arranged to select at least one object to be placed in each container of a set of a plurality of containers displayed on the display and an outcome generator arranged to determine a game outcome based on at least one characteristic of the object or objects placed in at least part of each container of the set of containers.

16 Claims, 9 Drawing Sheets

(56) References Cited

U.S. PATENT DOCUMENTS

| | | | | |
|---|---|---|---|---|
| 7,037,191 | B2 * | 5/2006 | Rodgers | G07F 17/32<br>463/16 |
| 7,144,322 | B2 | 12/2006 | Gomez et al. | |
| 7,507,152 | B2 * | 3/2009 | Halliburton | A63F 5/02<br>273/351 |
| 9,659,428 | B2 | 5/2017 | Jackson et al. | |
| 2002/0094856 | A1 | 7/2002 | Bennett et al. | |
| 2003/0054875 | A1 | 3/2003 | Marks et al. | |
| 2003/0092480 | A1 | 5/2003 | White et al. | |
| 2004/0140612 | A1 | 7/2004 | Sines et al. | |
| 2004/0192432 | A1 | 9/2004 | Walker et al. | |
| 2005/0054875 | A1 | 3/2005 | Hei et al. | |
| 2005/0059455 | A1 | 3/2005 | Gerrard et al. | |
| 2005/0187003 | A1 | 8/2005 | Adachi et al. | |
| 2005/0192073 | A1 | 9/2005 | Nakajima | |
| 2005/0192083 | A1 | 9/2005 | Iwamoto | |
| 2008/0227519 | A1 | 9/2008 | Jackson et al. | |

OTHER PUBLICATIONS

Poker Solitaire (retrieved on Dec. 11, 2008), retrieved from internet, http://web.archiver.org/web/20060325061956/http://www.jsworkshop.com/cards/pokersol.html; Published Mar. 25, 2006 as per Wayback Engine.

* cited by examiner

GAMING SYSTEM AND A METHOD OF GAMING

RELATED APPLICATIONS

This application is a continuation of co-pending U.S. application Ser. No. 13/080,132, filed Apr. 5, 2011, entitled "A Gaming System and a Method of Gaming," expected to issue as U.S. Pat. No. 9,659,428 on May 23, 2017, which is a continuation of U.S. application Ser. No. 11/936,640, filed Nov. 7, 2007, entitled "A Gaming System and a Method of Gaming," abandoned, and is related to and claims priority from, Australian Patent Application No. 2006906229, filed on Nov. 8, 2006, entitled "A Gaming System and a Method of Gaming," the contents of each of which are herein incorporated by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates to a gaming system, a game controller and a method of gaming.

Gaming systems are required to maintain player interest. There is a continuing need to develop new gaming systems in order to provide interest for players.

In some jurisdictions, regulations prohibit electronic gaming machines that employ a spinning reel and therefore it is desirable to provide a type of gaming machine which is not reliant on a spinning wheel.

BRIEF SUMMARY OF THE INVENTION

In a first aspect, the invention provides a gaming system comprising:

a display;

an object selector arranged to select at least one object to be placed in each container of a set of a plurality of containers displayed on the display; and an outcome generator arranged to determine a game outcome based on at least one characteristic of the object or objects placed in at least part of each container of the set of containers.

In an embodiment, the object selector is arranged to select a plurality of objects for each container.

In an embodiment, the object selector is arranged to select three objects for each of five containers.

In an embodiment, the gaming system further comprises a container selector operable by a player to select at least one container of the set of containers, the outcome generator arranged to determine a game outcome based on all objects of each selected container and based on objects of at least one type being in a designated part of each non-selected container.

In an embodiment, at least one other type of object may be included in the game outcome determination of the outcome generator even though it is not in the designated part of the container.

In an embodiment, an at least one other type of object is a feature object associated with free games.

In an embodiment, the containers are selected from the group comprising: tubes, tubs, baskets, and boxes.

In an embodiment, the objects are selected from the group comprising balls discs, dice, dominoes, cards, blocks, and balloons.

In an embodiment, different objects are distinguishable from one another by shape, colour, or marking.

In an embodiment, there are a plurality of sets of containers.

In an embodiment, one or more containers is in more than one set of containers.

In a second aspect the invention provides a method of gaming comprising:

displaying a set of containers on a display;

selecting at least one object to be placed into each container; and determining a game outcome based on at least one characteristic of the objector objects placed in at least part of each container of the set of containers.

In an embodiment, the method comprises selecting a plurality of objects for each container.

In an embodiment, the method comprises selecting three objects for each of five containers.

In an embodiment, the method comprises comprising receiving a player selection of at least one container of the set of containers, and determining a game outcome based on all objects of each selected container and based on objects of at least one type being in a designated part of each non-selected container.

In an embodiment, at least one other type of object may be included in the game outcome determination even though it is not in the designated part of the container.

In an embodiment, an at least one other type of object is a feature object associated with free games.

In a third aspect the invention provides a game controller comprising:

an object selector arranged to select at least one object to be placed in each container of a set of a plurality of containers displayed on a display; and an outcome generator arranged to determine a game outcome based on at least one characteristic of the object or objects placed in at least part of each container of the set of containers.

In an embodiment, the object selector is arranged to select a plurality of objects for each container.

In an embodiment, the object selector is arranged to select three objects for each of five containers.

In an embodiment, the game controller further comprises a container selector operable by a player to select at least one container of the set of containers, the outcome generator arranged to determine a game outcome based on all objects of each selected container and based on objects of at least one type being in a designated part of each non-selected container.

In an embodiment, at least one other type of object may be included in the game outcome determination of the outcome generator even though it is not in the designated part of the container.

In an embodiment, an at least one other type of object is a feature object associated with free games.

In a fifth aspect the invention provides a computer readable storage medium comprising the computer program code.

In a sixth aspect the invention provides a data signal comprising the computer program code.

BRIEF DESCRIPTION OF SEVERAL VIEWS OF THE DRAWINGS

Certain embodiments of the invention will now be described in relation to the following drawings in which.

Figure 1:
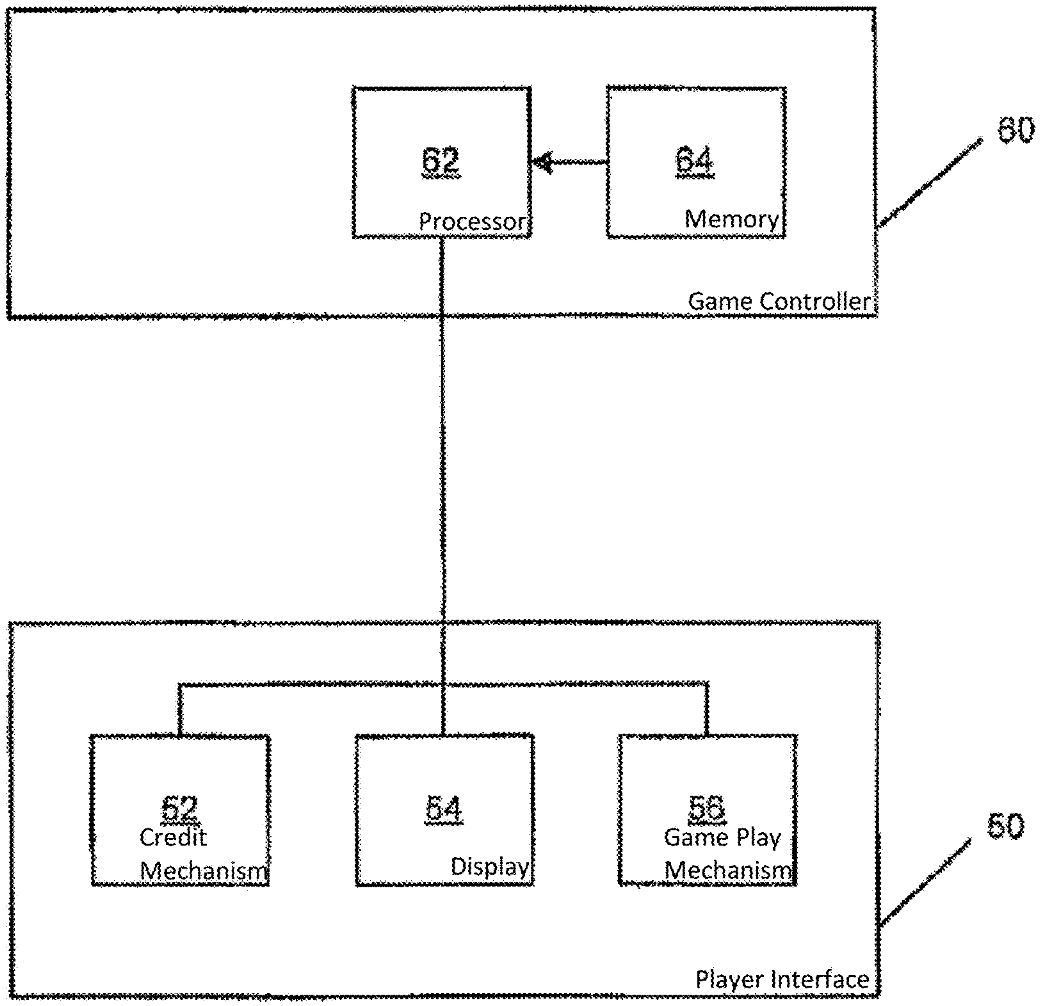
FIG. 1 is a block diagram of the core components of a gaming system.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

Referring to the drawings, there is shown a gaining system having a game controller arranged to implement a method of gaming where objects are placed in containers and a game outcome is determined based on at least one characteristic of the objects placed in the containers.

In a first form, a stand alone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaining machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Irrespective of the form, the gaining system comprises several core components. At the broadest level, the core components are a player interface 50 controller 60 as illustrated in FIG. 1. The player interface is arranged to enable manual interaction between a player and the gaming system and for this purpose includes the input/output components required for the player to enter instructions and play the game.

Components of the player interface may vary from embodiment to embodiment but will typically include a credit mechanism 52 to enable a player to input credits and receive payouts, one or more displays 54 and a game play mechanism 56 that enables a player to input game play instructions.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
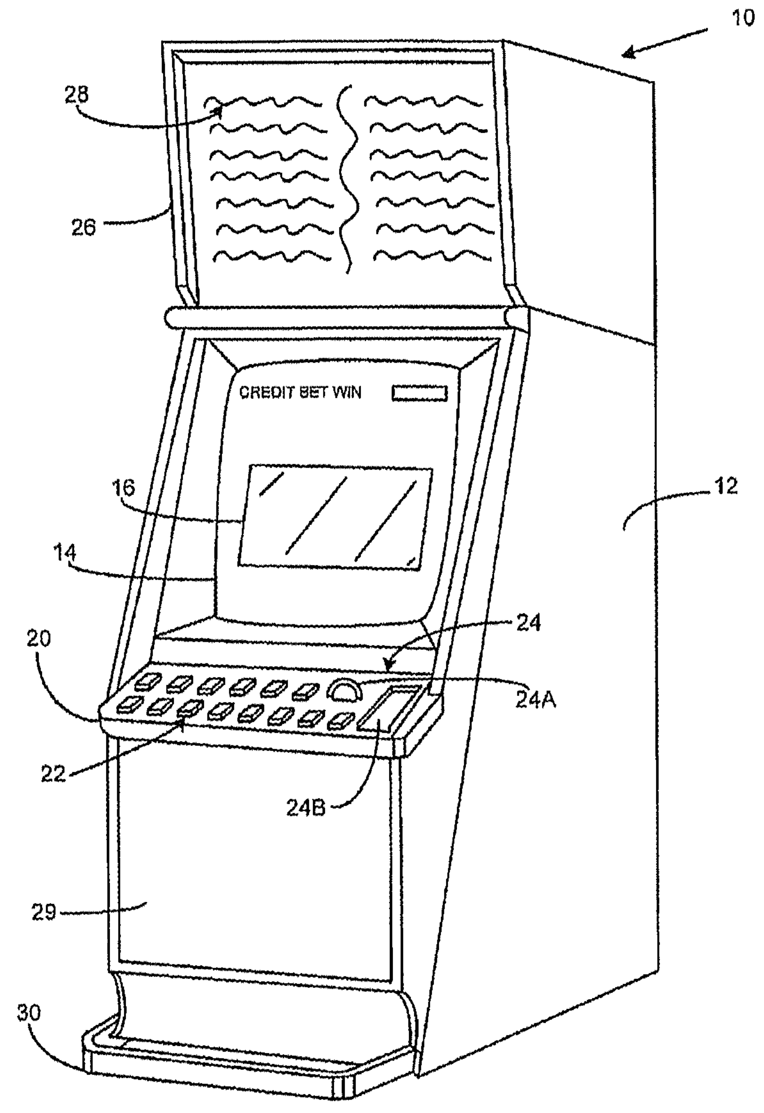
FIG. 2 is a perspective view of a gaming machine.

A gaming system in the form of a stand alone gaming machine 10 is illustrated in FIG. 2. The gaming machine 10 includes a console 12 having a display 14 on which is displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. A reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display mit, which may be of the same type as the display 14, or of a different type.

Figure 3:
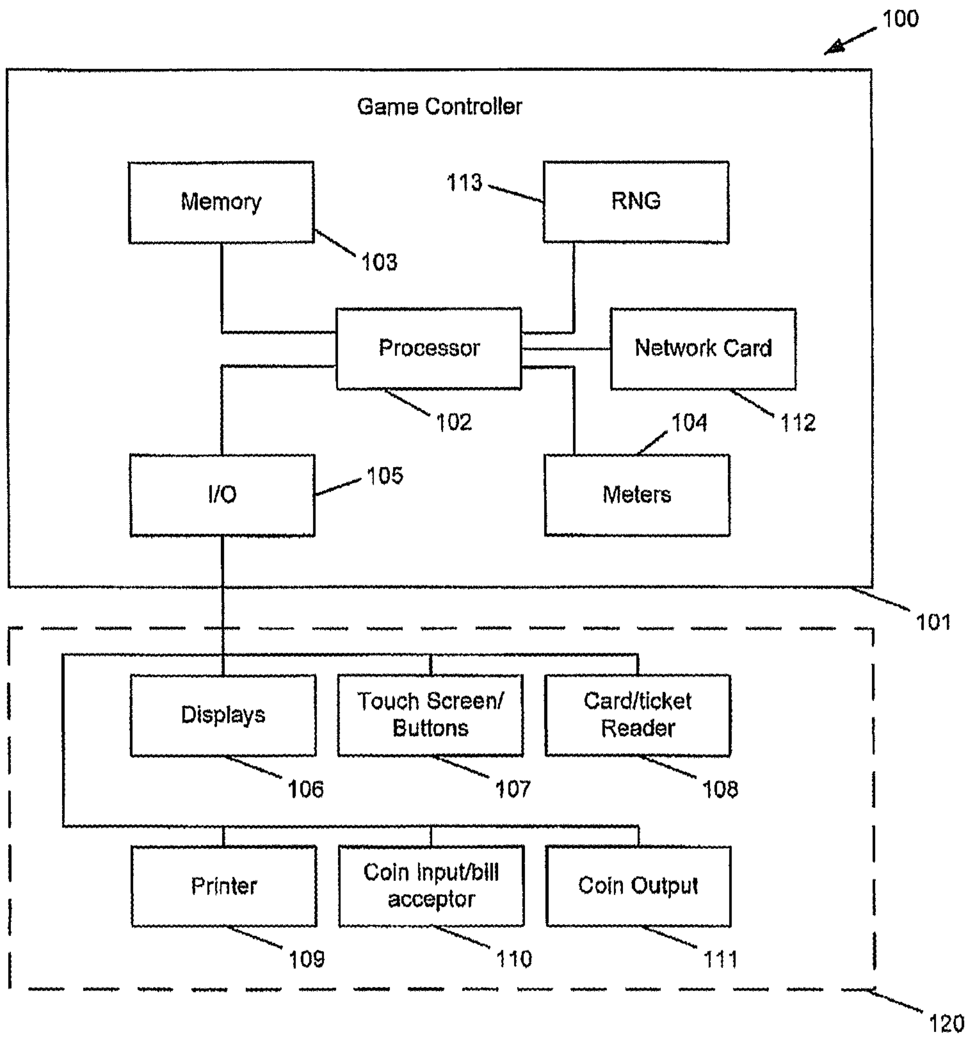
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 101 Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102.

In the example shown in FIG. 3, a player interface 120 includes peripheral devices that communicate with the game controller 101 comprise one or more displays 106, a touch screen and/or buttons 107, a card and/or ticket reader 108, a printer 109, a bill acceptor and/or coin input mechanism 110 and a coin output mechanism 111. Additional hardware may be included as part of the gaining machine 100, or hardware may be omitted as required for the specific implementation.

In addition, the gaming machine 100 may include a communications interface, for example a network card 112. The network card may, for example, send status information, accounting information or other information to a central controller, server or database and receive data or commands from the central controller, server or database.

Figure 4:
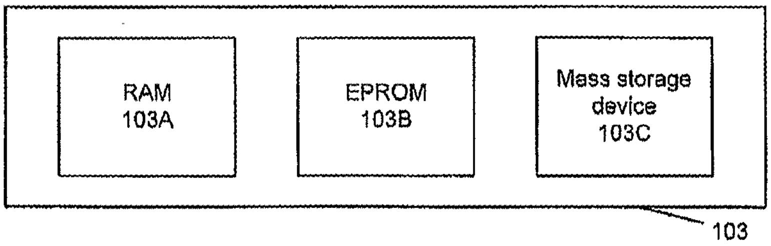
FIG. 4 is a block diagram representing the structure of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
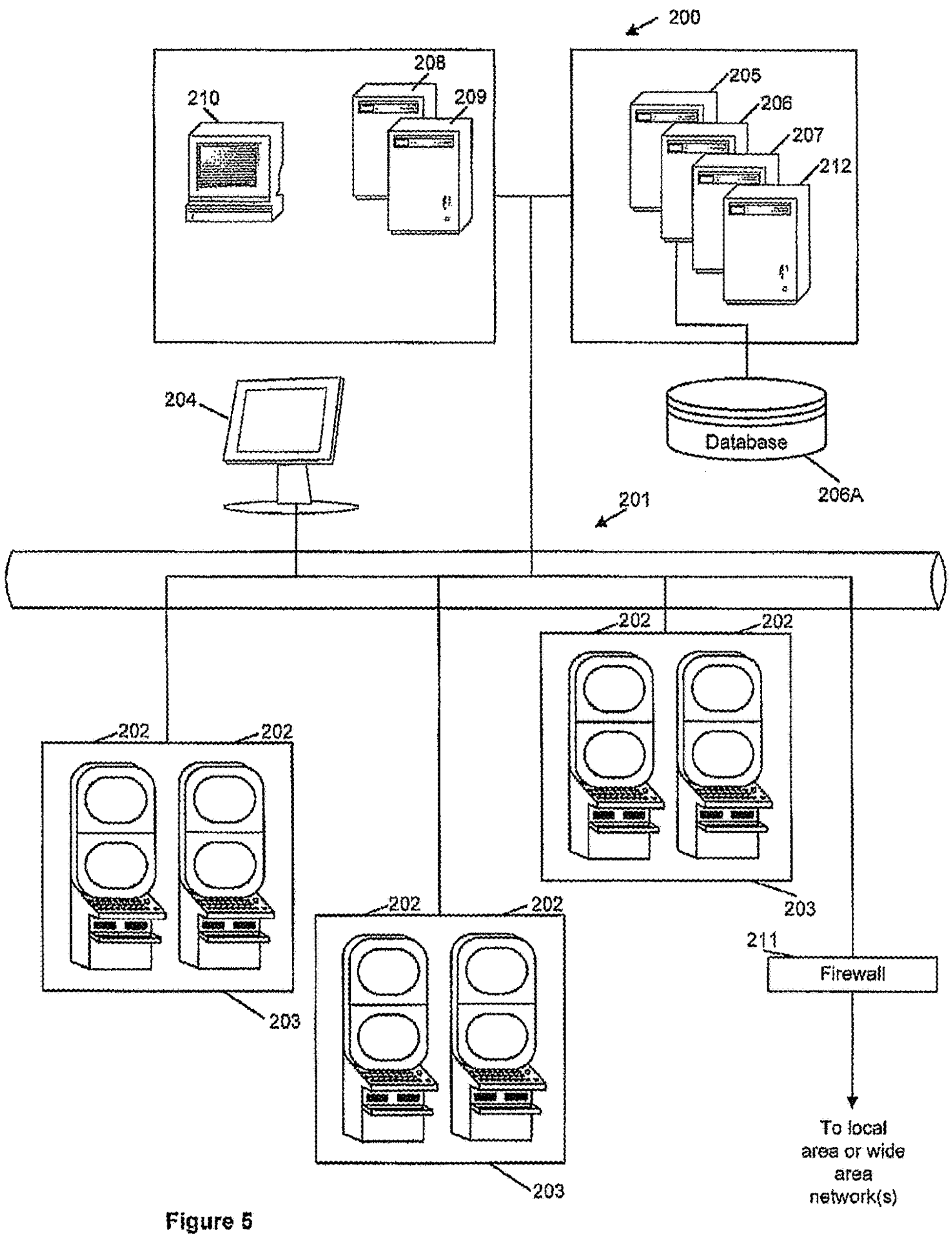
FIG. 5 is a diagram schematic of a networked gaining system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. The displays 204 may, for example, be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to implement the accounting functions for a Jackpot game. A player loyalty system 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming network 200, including for example a gaming floor management server 208, and a licensing server 209. to monitor the use of licenses relating to particular games. An administrator terminal 210 is provided to allow an administrator to run the network 201 and the devices connected to the network.

The gaining system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Persons skilled in the art will also appreciate that random includes pseudo-random. Further, persons skilled in the art will appreciate that a plurality of games servers could be provided to run different games or a single game server may run a plurality of different games as required by the terminals.

Persons skilled in the art will also appreciate that the method of certain embodiments could be embodied in program code and indeed that the game controller may be implemented by a processor executing the program code. The program code could be supplied in a number of ways, for example on a computer readable medium, such as a disc or a memory (for example, that could replace part of memory 103) or as a data signal (for example, by downloading it from a server).

Figure 6:
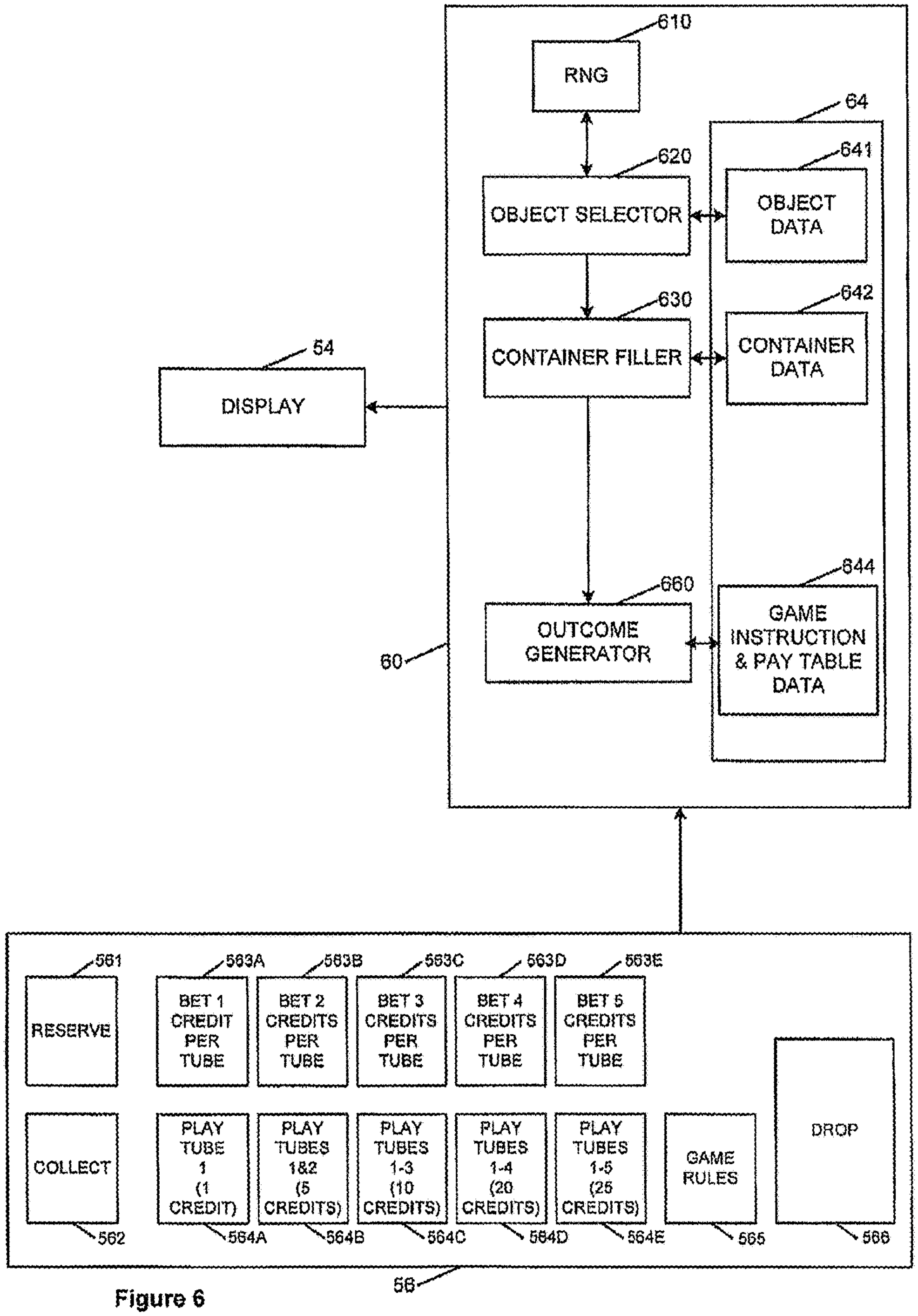
FIG. 6 is a functional block diagram showing detailed components of a game controller.

A game controller 60 of an embodiment is shown in FIG. 6. The game controller 60 is arranged to select objects to fill a series of containers to be displayed on display 54. The processor of game controller 60 executes code in memory 64 in order to implement a number of functions as described in detail below. Persons skilled in the art will appreciate that some of these function, e.g. random number generator 610 could be implemented by dedicated hardware.

Container data 642 is used by game controller 60 to populate the display 54 with the containers that are to be filled during game play. In order to initiate the game, a player selects which of the containers they will play using container selector 564 in the form of a plurality of buttons 564A-564E. The container selector 564 is a series of buttons that allows the player to select whether they will play the first container using button 564A, the first and second containers using button 564B, the first three containers using button 564C, the first four containers using button 564D, or all five containers using button 564E.

The player also selects how many credits the player will bet per container that the player is playing. That is, one credit using button 563A, two credits using button 563B, three credits using button 563C, five credits using button 563D, or twenty credits using button 563C of the gaining mechanism.

Once the player has specified parameters for the game, the player presses the drop button 566 to initiate game play. Once the player initiates game play, the container filler 630 of the game controller 60 populates the containers displayed on the display based on container data 642 that specifies the number of containers and the number of objects to be placed in each container. The container filler 630 requests object selections from the object selector 620. The object selector uses random number generator 610 to randomly extract objects from object pools 641 and provide these to container filler 630. In an embodiment, separate object pools are maintained for each container. The number of objects in each pool is undisclosed to the player. The object selector randomly selects the objects by randomly selecting from a probability table stored in memory 64 using the random number generator 610. In an embodiment, once an object has been selected from the pool for a container, that object is removed from the pool for subsequent selection. In this embodiment, the object selector 620 updates the object data 641 specifying the object pool each time an object is selected. Persons skilled in the art will appreciate that other techniques may be used to select multiple objects for one container. For example, the objects stored in the pool may be stored in a sequence or otherwise linked together and following one object being displayed the next two objects in the sequence may be placed into the container. As the objects are selected, they are displayed as being placed into the containers on display 54.

The container filler 630 also provides data specifying the objects that have been selected to the outcome generator 660. The outcome generator determines the outcome of the game based on the game instruction and pay table data 644 stored in memory 64. The game outcomes are output to the display 54.

The player can elect to reserve the machine by pressing button 561 or collect their winnings by pressing button 562. At any time, the player can check the game rules by pressing button 565 which displays the pay table and other rules.

Persons skilled in the art will appreciate there may be a number of variations to the above gaming system.

Objects can include but are not limited to representations of:

Balls
Discs
Dice
Dominoes
Cards
Blocks
Balloons
Fish

The objects are uniquely identified by at least one characteristic, including but not limited to:

Shape
Colour
Images or Symbols Numbers

The objects' characteristics can be used in combination by the outcome generator to determine winning patterns—e.g. red balls pay 10, balls with the number 7 pay 5, red balls with 7 pay 50.

Containers may be:

Tubes (closed or open ended)
Tubs
Baskets
Boxes

In an embodiment, the containers enable the objects to be collected in such a manner that order' can be defined, thus enabling various patterns of objects to be formed and perceived by the player. In one embodiment, the containers can be connected.

Depending on the specific implementation, a bet can purchase the usual items known in gaming, including but not limited to:

Prize patterns
Multiple pay tables
Certain uniquely identified objects Features

In particular, the above embodiment, has been described in relation to an arrangement where the player selects containers they which to play to establish their entitlement to win (i.e. based on all objects in selected containers and only certain objects in non-selected container. In other embodiments, pay patterns may be defined, for example which have one position from each container and the player's entitlement to win may be established based on their selection of pay patterns. For example, so they win based on combinations on pay patterns they have selected. In some embodiments, there may be further wins based on scatter pays and the like.

In an embodiment, the objects move onto the screen by dropping but, in an alternative embodiment, the objects move onto the screen by floating upwards (e.g. if the images are balloons) with the labelling of button 566 changed accordingly. The rate of drop or rise can be constant or it can be variable. Variation can be due to:

The number of objects already in the container, The order of the container being filled; or The type of objects already in containers.

In one embodiment, the objects can be balloons which when "touched" will "burst and disappear" from the screen. For example, when a predetermined number of balloons are on the screen.

Persons skilled in the art will also appreciate that in the above description there is a single set of containers in relation to which an outcome is determined by the outcome generator 660. That is, the five containers given as an example above provide a set of five containers. Persons skilled in the art will appreciate that there may be more than one set of containers. For example, fifteen containers grouped in three sets of five containers. Persons skilled in the art will also appreciate that containers can be formed into sets of containers in different ways. For example, one or more containers may belong to two different sets of containers.

Figure 10:
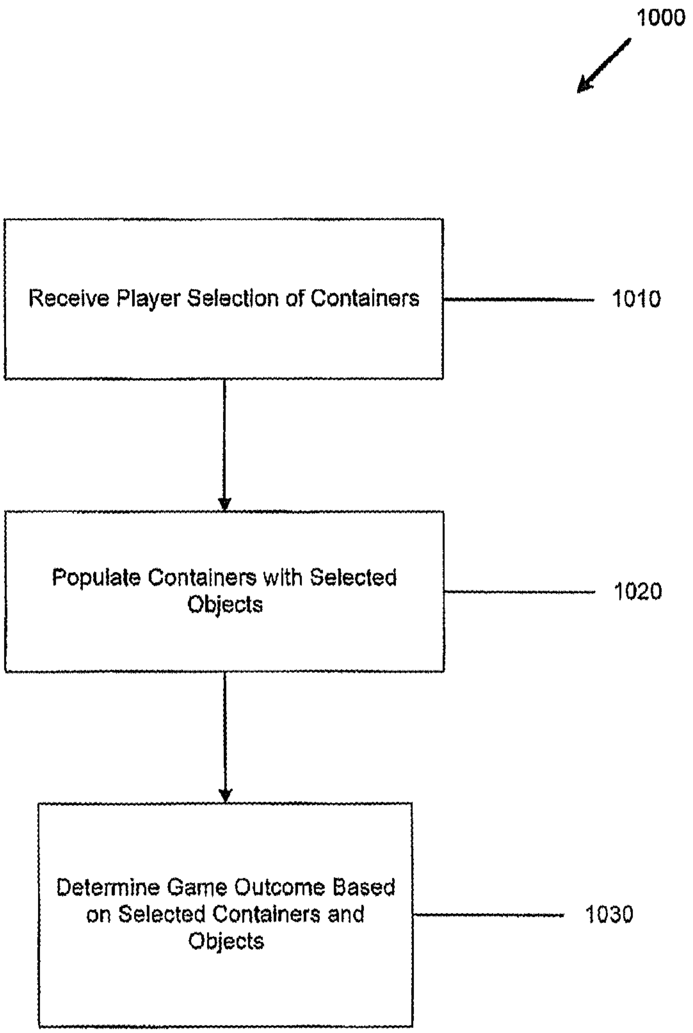
FIG. 10 is a flow chart of a method of an embodiment.

Method 1000 of an embodiment is summarised in FIG. 10. The method involves receiving a player selection of containers 1010, populating 1020 the containers with selected objects and determining 1030 the game outcome based on selected containers and objects.

The determination involves all objects of each selected container but only designated objects of each non-selected container in the determination. The determination may include additional features, for example, a free game symbol may form part of the game outcome even if in a non-designated area of a non-selected container.

Persons skilled in the art will appreciate that the above method can be implemented as program code which when executed will cause a computer to execute computer implemented game method. The computer can be any appropriate combination of processor, memory, and other hardware. The Computer program code may be supplied on a computer readable medium, such as disk, or by a data signal in a data transmission.

A detailed example of the game will now be described in relation to the game controller of an embodiment illustrated in relation to a detailed example.

EXAMPLE

In this example, the objects are balls in a ball drop game where the player selects one to five displayed onscreen tubes using buttons 564A-564E to be lit, and then presses "Drop" button 566 to initiate three balls dropping into each tube. In this example, there are ten different coloured balls, plus two specially rendered balls, a WILD and a FREE DROP ball. That is, in this game the objects' characteristics are their colour and whether they are a WILD or FREE DROP ball. Balls of the same colour pay if they appear anywhere in consecutive tubes from left to right. In unbought (non-selected) tubes, however, only the middle ball pays (i.e. is included in determining the game outcome) and the top and bottom balls are darkened on the display 54 to indicate that these tubes have not been selected. Persons skilled in the art will appreciate that this means that only balls placed in the middle part of the tube pay, and that any other part of the tube may be designated as the paying part, for example, the bottom position of each non-selected tube.

The WILD ball 840 substitutes for all symbols and appears in tubes 2 and 4. Three or more FREE DROP balls appearing from left to right in any position wins a free drop feature. FREE DROP balls will pay and initiate the FREE DROP feature even if they appear in darkened sections of unbought tubes, but like every symbol they must still appear on the leftmost tube and then appear consecutively from left to right. In this example, Tubes are always bought from left to right. In the FREE DROP feature, the player plays the game without paying credits and special rules apply to how credits may be accumulated as described below.

1, 2, 3, 4 or 5 credits (cents) can be bet on each tube. The cost to play one tube is 1 credit, two tubes cost 5 credits, three cost 10, four cost 20 and playing all five tubes costs 25 credits. All wins are multiplied by the credits bet per tube except the FREE DROP ball—its wins are multiplied by the total number of credits bet.

Free drops are played in the same number of tubes with the same credits bet per tube as the drop that triggered the free drops. 10, 15 or 20 free drops are won by 3, 4 or 5 FREE DROP balls, respectively. During the free drops, any WILD substituting in tube two multiplies the win by three, and also, any WILD substituting in a win in tube four multiplies the win by five. Hence, any win with WILD substituting in tubes two and four simultaneously during the free drops is multiplied by fifteen.

Figure 7:
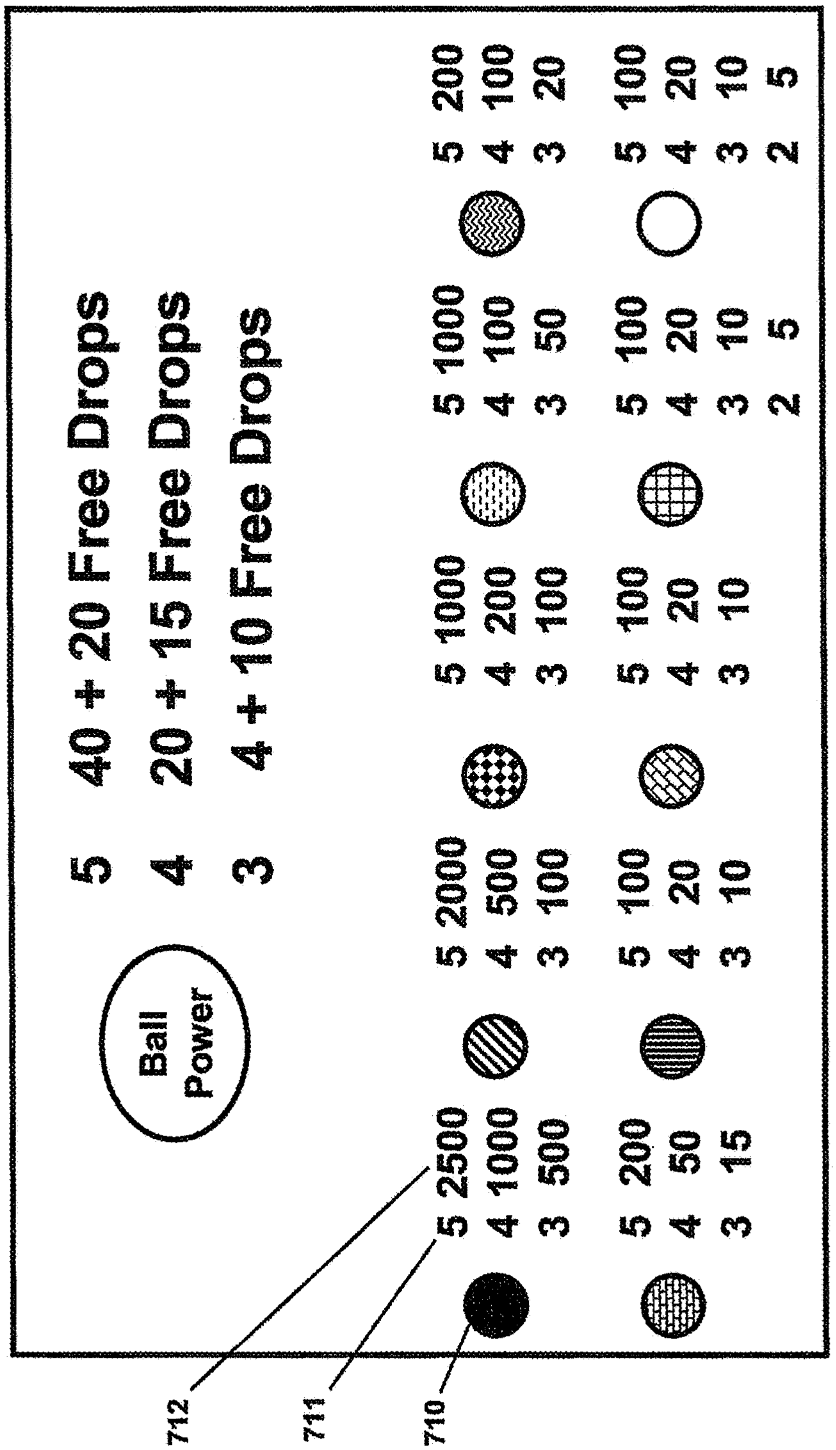
FIG. 7 shows an exemplary table.

The pay table is illustrated in FIG. 7. The pay table shows that for the free game ball (called the "ball power" ball), five of the same balls results in the player obtaining 40 credits per credit bet plus twenty free drops. Four ball power balls lead to 20 credits and fifteen free drops and three ball power balls lead to 4 credits and ten free drops. In each drop, all the containers are filled. Pay table items are also specified for each coloured ball as indicated by a picture of the ball, the number of balls and the number of credits shown in that order. For example, for a red ball 710, for five balls 711, there is a prize of 2,500 credits 712.

The pay table also specifies out other rules of the game. During the game, balls drop into five tubes and pay 3, 4, 5 of a kind starting in the left tube. The record symbol is a WILD ball which substitutes for all other balls. During the free drops feature of the game, the WILD symbol substituting in tube two multiples the win by three. During the free drops, the WILD symbol substituting in tube four multiplies the win by five.

The player selects their number of tubes (with associated tube cost) using a tube selector 564 in the form of buttons 564A-564E and bet per tube using buttons 563A-563E and presses "Drop" to initiate play. Meters 841-845 on display 54 indicate the CREDIT 841 available to the player, the number of TUBES 842 being played, the BET PER TUBE 843, the TOTAL BET 844 (which is tube cost times bet per tube) and the WIN 845 of the current game.

Figure 8:
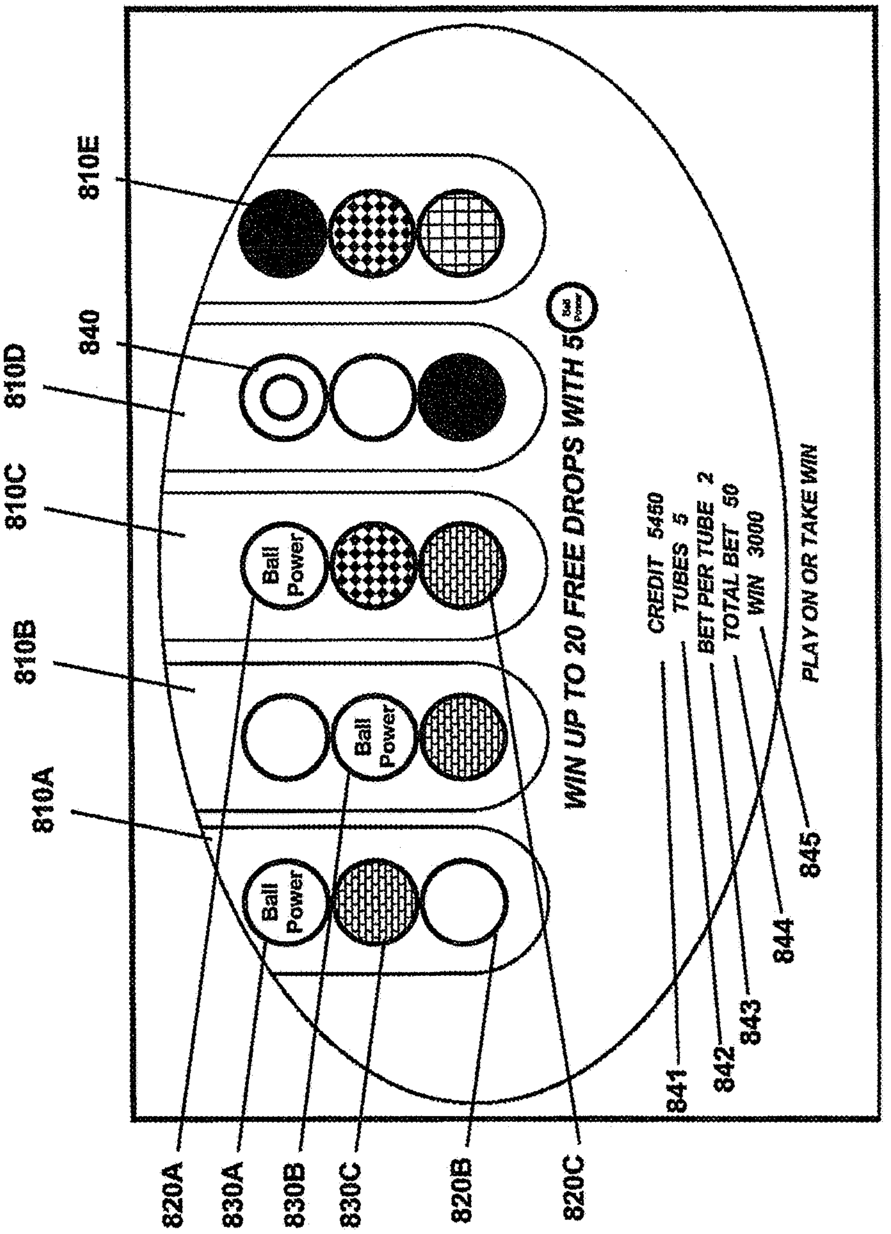
FIG. 8 shows a screen shot of an exemplary game outcome.

Five tubes are displayed prominently on screen and each drop involves an animation of three balls falling vertically into each tube. A sequence of balls for each tube is selected randomly for each tube. An exemplary screen layout is shown in FIG. 8. In this screen, the WILD ball is depicted as a vinyl phonographic record and the FREE DROP ball bears the name of the game, "Ball Power". This screen shows the player betting 2 credits on all five tubes, and winning 4-of-a-kind RED ball (1,000 credits) and 4-of-a-kind FREE DROP ball (20 credits), both with WILD substitution. This results in a credit win of 3,000 (2×1,000+50×20), as well as triggering 15 free drops (free drops are not multiplied).

Figure 9:
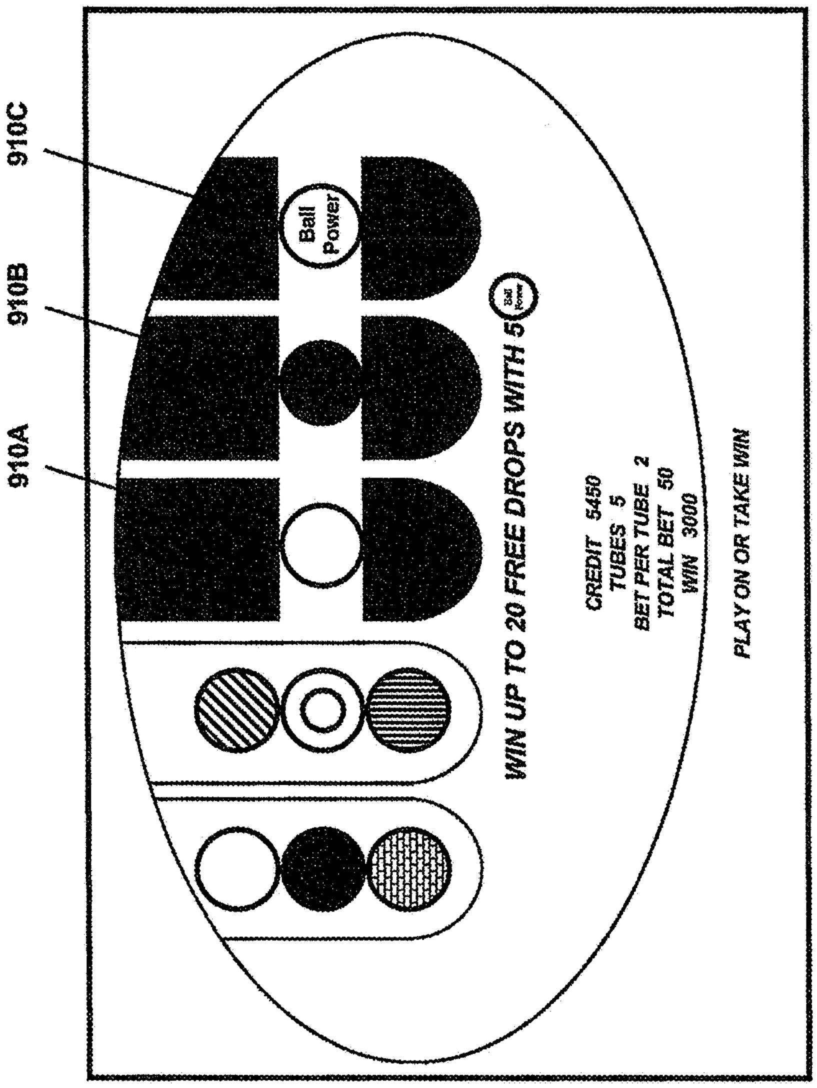
FIG. 9 shows a screen shot of a second exemplary game outcome.

Playing two tubes is shown in FIG. 9. Note that the right three tubes are displayed with parts 910A-910F of the tube darkened to show that only the designated middle part of the tube will be used in determining the game outcome for the coloured ball objects.

Further variations will be apparent to persons skilled in the art and fall within the scope of the invention described herein.

The invention claimed is:

1. A gaming system operable to play a game of objects, the gaming system comprising:

a credit input mechanism configured to receive a physical item associated with a monetary value for establishing a credit balance, the credit balance being increasable and decreasable based at least on wagering activity;

a credit meter configured to monitor the credit balance;

a memory having data indicative of a plurality of objects and a plurality of containers;

a random number generator;

a display;

an input device manually operable by a player and configured to receive a player selection of a first number of the plurality of containers, wherein the first number of containers is less than the plurality of containers by a second number of the plurality of containers;

a game controller coupled to said memory and configured, in response to a wager placed by a player and deducted from the credit balance, (1) to display a first display state on said display in which no objects are displayed within the plurality of containers, (2) to randomly select, using the random number generator and the memory, a number of the plurality of objects to be placed in the plurality of containers displayed on the display, (3) to display a second display state in which the selected number of the plurality of objects are displayed as moving into the first number of the plurality of containers until the first number of the plurality of containers are filled with the selected objects, and (4) to visually darken a part of the second number of the plurality of containers so as to display at least one selected object via an undarkened part of the second number of the plurality of containers; and wherein the game controller is further configured to determine a game outcome from the selected objects in the first number of the plurality of containers and the selected objects displayed in the undarkened part of the second number of the plurality of containers;

wherein the game controller is further configured to, in response to determining that the game outcome including a winning outcome, increase the credit balance; and a payout mechanism configured to provide a prize based on at least a portion of the credit balance.

2. A gaming system as claimed in claim 1, and wherein the game outcome is a first outcome, and wherein the game controller is further configured to determine (1) a second, different game outcome based on all objects of each of the first number of the plurality of containers and (2) a third, different game outcome based on objects in the second part of each of the second number of the plurality of containers.

3. A gaming system as claimed in claim 1, wherein the input device is further configured to receive a second player selection of one of the selected objects to be removed from filling the first number of the plurality of containers.

4. A gaming system as claimed in claim 1, wherein the containers are selected from a group comprising: tubes, tubs, baskets, and boxes.

5. A gaming system as claimed in claim 1, wherein the objects are selected from the group comprising balls, discs, dice, dominoes, cards, blocks, fish and balloons.

6. A gaming system as claimed in claim 1, wherein the plurality of objects are distinguishable from one another by shape, color, or marking.

7. A gaming system as claimed in claim 1, wherein the plurality of containers form one set of containers, and wherein the memory is further configured to include a plurality of sets of containers.

8. A gaming system as claimed in claim 1, wherein one or more containers is in more than one set of containers.

9. A method of playing a game of objects on a gaming machine comprising a credit input mechanism configured to receive a physical item associated with a monetary value for establishing a credit balance, the credit balance being increasable and decreasable based at least on wagering activity, a credit meter configured to monitor the credit balance, a memory having data indicative of a plurality of objects and a plurality of containers, an input device manually operable by a player and configured to receive a player selection of a first number of the plurality of containers, wherein the first number of containers is less than the plurality of containers by a second number of the plurality of containers, a display, a payout mechanism, and a game controller including a random number generator and coupled to said memory, the method comprising, in response to a wager placed by a player and deducted from the credit balance:

displaying on the display a first display state on said display in which no objects are displayed within the plurality of containers;

selecting randomly via the random number generator and the memory a number of the plurality of objects to be placed in the plurality of containers displayed on the display;

displaying a second display state in which the selected number of the plurality of objects are displayed as moving into the first number of the plurality of containers until the first number of the plurality of containers are filled with the selected objects;

visually darkening at the display a part of the second number of the plurality of containers so as to display at least one selected object via an undarkened part of the second number of the plurality of containers;

determining via the game controller a game outcome from the selected objects in the first number of the plurality of containers and the selected objects displayed in the undarkened part of the second number of the plurality of containers;

in response to determining that the game outcome including a winning outcome, increasing via the game controller the credit balance; and providing via the payout mechanism a prize based on at least a portion of the credit balance.

10. A method as claimed in claim 9, wherein the game outcome is a first outcome, the method further comprising determining (1) a second, different game outcome based on all objects of each of the first number of the plurality of containers and (2) a third, different game outcome based on objects in the undarkened part of each of the second number of the plurality of containers.

11. A method as claimed in claim 10, the method further comprising receiving a second player selection of one of the selected objects to be removed from filling the first number of the plurality of containers.

12. A method as claimed in claim 9, the method further comprising selecting the containers from a group comprising: tubes, tubs, baskets, and boxes.

13. A method as claimed in claim 9, the method further comprising selecting the objects from the group comprising balls, discs, dice, dominoes, cards, blocks, fish and balloons.

14. A method as claimed in claim 9, the method further comprising distinguishing the plurality of objects from one another by shape, color, or marking.

15. A method as claimed in claim 9, wherein the plurality of containers form one set of containers, and wherein the memory is further configured to include a plurality of sets of containers.

16. A method as claimed in claim 9, wherein one or more containers is in more than one set of containers.

* * * * *